Oct. 9, 1928.

N. D. LEVIN 1,686,566

CHAIN AND ATTACHMENT THEREFOR

Original Filed June 23, 1924

Patented Oct. 9, 1928.

1,686,566

UNITED STATES PATENT OFFICE.

NILS D. LEVIN, OF COLUMBUS, OHIO, ASSIGNOR TO THE JEFFREY MANUFACTURING CO., OF COLUMBUS, OHIO, A CORPORATION OF OHIO.

CHAIN AND ATTACHMENT THEREFOR.

Application filed June 23, 1924, Serial No. 721,871. Renewed July 3, 1928.

The present invention relates to certain new and useful improvements in chains and attachments therefor, and particularly to chains and attachments which are adapted for use in conveyors of the scraper type.

One object of this invention is to provide an improved chain of the type specified, which, within certain limits, is universally flexible, so as to accommodate itself to various inequalities of the surfaces over which it passes.

Another object is to provide improved means for connecting together the ends of said chain.

A further object is to provide improved means for the attachment of conveying elements to said chain, whereby said conveying elements will be rigidly held against both angular and bodily movement longitudinally of the chain, but will be permitted to freely swing in planes extending transversely of the chain.

Further, the conveying elements themselves present novel and advantageous features.

The means whereby I attain these objects are fully set forth in the following specifications and illustrated in the accompanying drawings, in which.

Like numerals refer to like parts in the several views.

Figure 1:
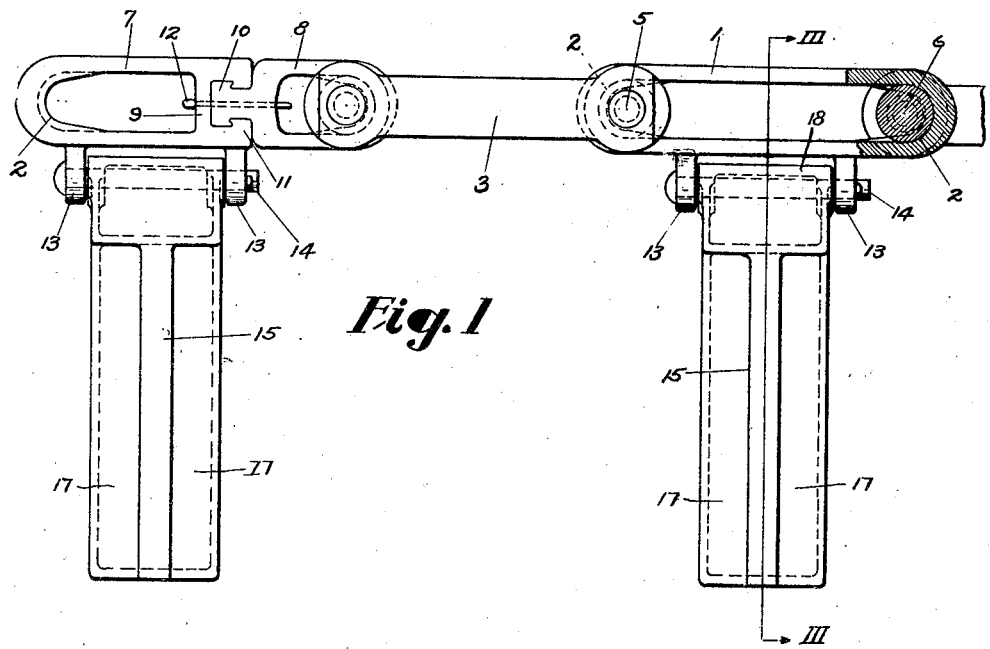
Fig. 1 is a plan view, partly in section, of a chain embodying my invention, with conveyor elements attached.

As shown in the drawings, my improved chain comprises a series of alternate strap and bar links which are so articulated as to permit universal flexure of the chain within limits sufficient to take care of the usual conditions under which it is used.

The strap links consist of flattened endless loops 1, preferably formed of metallic bar stock of substantially rectangular cross-section, but, if desired, they may be formed of castings or drop forgings having elongated apertures extending longitudinally of the links, and at each end there is formed a bearing seat 2 of spherical curvature.

Each bar link is formed of a pair of parallel side bars 3 having, at the ends, inwardly projecting conical bosses 4, to give the proper thickness of metal for the pintles presently to be described. The bosses 4 are pierced by suitable apertures, into which pintles 5 are secured in any suitable manner, being here shown as riveted. Between the bosses 4, the pintles 5 are provided with the spherical bodies 6 which engage the bearing seats 2 of the adjacent link, and these parts are of such proportions as to permit universal relative angular movement of adjacent links.

Figure 2:
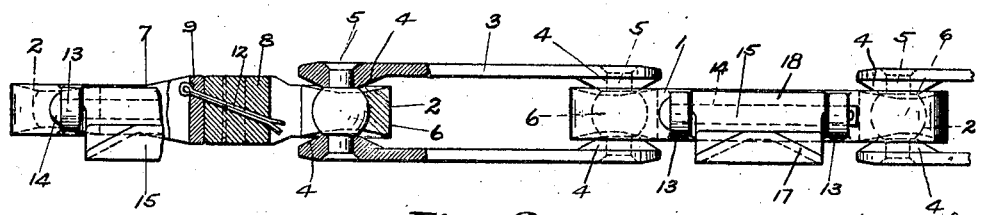
Fig. 2 is a side elevation, partly in section, of the chain illustrated in Fig. 1, showing, in end elevation, the conveyor elements.
Figure 3:
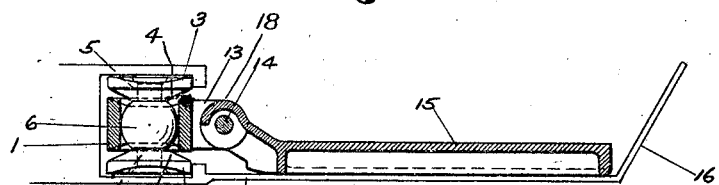
Fig. 3 is a section taken along the line III—III of Fig. 1, showing the chain and, in section, the conveying elements, these parts being shown in their relation to the conveyor trough.

The spherical portions 6 of the pintles 5, which are engaged by the seats 2 of links 1, permit universal movement of the links relative to one another. It will be seen that the coned portions 4 at the ends of links 3, which give the requisite strength for supporting the pintles 5, are opposed by complementary recesses formed in the side faces of the links 1, so that a sufficient clearance is provided to permit rocking of the links relative to each other upon the spherical end bearings. Reference to Figs. 2 and 3 of the drawings shows that the conical portions 4 and the opposed complementary recesses are not in contact, but merely give clearance for free link movement in $n$ directions.

To connect the ends of the chain together, I have provided a coupling link 7 which is formed of the parts 8 and 9, each having an end bearing seat 2, similar to the seats formed in the links 1, adapted to engage the pintle 6 of the adjacent bar link. Formed on the end of the part 8 is one member of an interlocking connection, here shown as a transversely extending dovetail projection 10 adapted to engage an interlocking member on the part 9, here shown as a socket 11.

These parts are so shaped that they may be engaged or disengaged by lateral movement of one member, that is, the dovetail 10 relative to the other member, that is, socket 11. A cotter pin 12 may, if desired, be inserted in aligned apertures of the parts 9 and 10 when said parts are in engaged position, to prevent their accidental disengagement. Preferably, the cotter pin 12 will be disposed as shown, in an inclined position, so that it will be more readily accessible for withdrawal or insertion, and its split end on the opposite side of the chain will be easy of access.

It will be observed that this connecting link is of such construction as to effectively take care of not only the usual longitudinal strains on the chain, and no weakness can develop at this point, but also any torsional strains which may be set up, without danger of separating, and, furthermore, without any strain upon the cotter pins, or other fastening means used. At the same time, the construction is such that upon removal of the cotter pin or equivalent fastening means, the parts, by relative lateral movement, may be very readily separated.

It is to be understood, however, that the parts above described may be subject to wide variation in structure without departing from the spirit of my invention.

The strap links 1 are provided, as here shown, with two laterally projecting lugs 13, a pivot pin 14 being removably mounted therein, upon which pin is mounted the laterally projecting conveyor flight 15. By this means the flights 15 are securely held against both angular and bodily movements longitudinally of the chain, but are free to swing about the pivot pins 14 in planes extending transversely thereof. For example, as shown in dotted lines in Fig. 3, the flight 15 may be thrown, either manually or by mechanical means, to an idle position, and, due to its construction and mounting, will remain in such tilted position until again thrown to working position, as shown in full lines.

I have shown, in the drawing, a carrier flight adapted to slip beneath loose material and carry it into and along the conveyor, it being here shown in connection with a conventionally illustrated trough 16, and while other forms of conveyor flights adapted to propel material may be substituted for that here illustrated, I have found the particular flight shown to possess marked advantages with certain classes of material. The said flight 15 is formed hollow, as shown, for lightness, and an inclined portion 17, preferably, on each side of the longitudinal center of the flight, so as to be effective in either direction of movement of the chain. This gives a flight of sufficient height and of shovel-like formation to engage and carry along loose material, such as coal, without sliding idly underneath it, and yet it will pass under, without stalling or breaking, any body too heavy to be moved. In practice, masses of loose material will accumulate between the opposed inclines 17 of adjacent flights and carried along en masse.

The rear or attaching end 18 of the flight 15 is preferably thrown up at an angle to meet the center line of the chain, as shown, while permitting the body of the flight to be flat upon the ground. Such angularly disposed end also permits the overthrow of the body 15 when the flight is thrown to the dotted line position shown in Fig. 3.

In order to protect the pivot bolt 14 and prevent jamming or clogging the pivotal action of the flight, the attaching end 18 is carried over or curved about the pivot member 14 (see Fig. 3) to house and protect it.

From the foregoing disclosure, it will be seen that I have provided a chain which is capable of being flexed, not only in the usual manner at the articulations of its links in a plane parallel to its longitudinal axis, but may also be flexed in $n$ planes perpendicular to the plane of its longitudinal axis.

This construction gives an extremely useful chain and flight, particularly in a conveyor chain of this type, for the universal movement of the links, by reason of the articulations shown and described, ensures the chain and its conveyor flights adapting itself to the inaccuracies of the surface over which the flights travel. These flights attached to the chain will, furthermore, by reason of this universal flexibility, adapt themselves to contours and inequalities of the surface over which they travel, and more effectively handle the material. The flights, due to their construction, will pick up and carry proper loads, but will not clog or break upon striking immovable obstructions.

Such changes as involve mechanical skill or the adoption of mechanical expedients equivalent of those herein disclosed, are to be regarded as within the purview of my invention.

What I claim is:—

1. In a chain, a link comprising a pair of substantially parallel side bars, a pintle connecting said side bars and having a spherical bearing portion intermediate and spaced from the inner planes of said side bars, a second link having a thickness less than the distance between the inner planes of said side bars, and an elongated aperture at an end of which said spherical portion is adapted to be engaged, and means for guiding said second link into operative seated relation with said spherical portion upon the application of traction to one of said links.

2. In a chain, a link comprising a pair of substantially parallel side bars having inwardly extending opposed tapering bosses, a pintle having a spherical bearing surface between said bosses, and a second link having a thickness less than the distance between the inner planes of said side bars, said second link having an elongated aperture provided at an end thereof with a spherical bearing surface and adapted to be guided by said bosses to seat said bearing surfaces in co-operating relation.

3. In a chain, a link comprising a pair of substantially parallel side bars having inwardly extending opposed conical bosses, a pintle having a spherical bearing surface between said bosses, and a second link having a thickness less than the distance between the inner planes of said side bars, said link having an elongated aperture provided at an end thereof with a spherical bearing surface and adapted to be guided by said bosses to seat said bearing surfaces in co-operating relation.

4. In a chain, a link comprising a pair of substantially parallel side bars having inwardly extending opposed conical bosses, a pintle having a spherical bearing portion seated at opposite sides against the extremities of said bosses, and a second link having a thickness less than the distance between the inner planes of said side bars, said link having an elongated aperture provided at an end thereof with a spherical bearing surface and adapted to be guided by said bosses to seat said bearing surfaces in co-operating relation.

5. In a chain, a link comprising a pair of substantially parallel side bars having inwardly extending opposed conical bosses, a pintle coaxial with said bosses and having a spherical bearing portion abutting the extremities of said bosses, and a second link having a thickness less than the distance between the inner planes of said side bars, said link having an elongated aperture provided at an end thereof with a spherical bearing surface and adapted to be guided by said bosses to seat said bearing surfaces in co-operating relation.

6. In a chain, a link comprising a pair of substantially parallel side bars having inwardly extending opposed tapering bosses, a pintle having a spherical bearing portion engaged between said bosses, and a second link having a thickness less than the distance between the inner planes of said side bars, said link having an elongated aperture provided at an end thereof with a spherical bearing surface and adapted to be guided by said bosses to seat said bearing surfaces in co-operating relation, the bounding faces at the bearing end of said aperture being bevelled for permitting relative swinging of said links in planes transverse to the axis of said pintle.

In testimony whereof I have hereunto set my hand.

NILS D. LEVIN.